United States Patent
Northern et al.

(10) Patent No.: US 7,137,209 B2
(45) Date of Patent: Nov. 21, 2006

(54) LEVEL AND PROTRACTOR

(76) Inventors: Robert Theodore Northern, 2733 Hartzer St., South Bend, IN (US) 46628; Jory John Klopp, 3688 Crestview Dr., St. Joseph, MI (US) 49085

( * ) Notice: Subject to any disclaimer, the term of this patent is extended or adjusted under 35 U.S.C. 154(b) by 34 days.

(21) Appl. No.: 10/910,442

(22) Filed: Aug. 2, 2004

(65) Prior Publication Data
US 2005/0022405 A1 Feb. 3, 2005

Related U.S. Application Data

(60) Provisional application No. 60/492,067, filed on Aug. 1, 2003.

(51) Int. Cl.
G01C 9/00 (2006.01)
G01C 9/24 (2006.01)
G01C 9/12 (2006.01)
G01C 15/00 (2006.01)

(52) U.S. Cl. .............. 33/371; 33/391; 33/529; 33/286; 33/DIG. 1; 33/DIG. 21

(58) Field of Classification Search .......... 33/370–377, 33/347, 379, 529, 412, 351, 343, 349, 391, 33/397, 398, 399, 286, 227, 281, 282, 283, 33/285, DIG. 21, DIG. 1
See application file for complete search history.

(56) References Cited

U.S. PATENT DOCUMENTS

| | | | | |
|---|---|---|---|---|
| 898,092 A * | 9/1908 | Carrier | ................ | 33/352 |
| 964,066 A * | 7/1910 | Sprenkle | .............. | 33/398 |
| 2,449,870 A * | 9/1948 | Austen | ................ | 33/368 |
| 3,427,724 A * | 2/1969 | Harold | ................ | 33/339 |
| 4,394,799 A * | 7/1983 | Moree et al. | ............ | 33/343 |
| 4,589,213 A * | 5/1986 | Woodward | .......... | 33/371 |
| 5,063,679 A * | 11/1991 | Schwandt | ............ | 33/347 |
| 5,103,569 A * | 4/1992 | Leatherwood | ...... | 33/379 |
| 5,167,075 A | 12/1992 | Weldy et al. | | |
| 5,388,337 A * | 2/1995 | Powers, II | ............ | 33/273 |
| 5,488,777 A * | 2/1996 | Erdesky | ............... | 33/280 |
| 5,561,911 A * | 10/1996 | Martin | ................ | 33/365 |
| 6,073,356 A * | 6/2000 | Li | ..................... | 33/391 |
| 6,131,298 A * | 10/2000 | McKinney et al. | ..... | 33/372 |
| 6,351,890 B1 * | 3/2002 | Williams | ............. | 33/286 |
| 6,442,853 B1 * | 9/2002 | Hale et al. | ........... | 33/194 |

(Continued)

Primary Examiner—Diego Gutierrez
Assistant Examiner—Amy R. Cohen
(74) Attorney, Agent, or Firm—Reginald J. Hill; Alexander Rozenblat

(57) ABSTRACT

A level and protractor tool (100) includes a body (102) with three sections. The first section (106) includes a spring clip (108) mounted on the body. The spring clip is adapted to be attached to an item that is to be bent or otherwise measured with the level and protractor tool (FIG. 6). The second section (128) is contiguous with the first section. The second section includes a mounting pin (132) defining a rotational axis for both a pointer (134) and a degree wheel (136) having a pendulum weight (306). The degree wheel and the pointer are positioned with respect to the mounting pin for rotational movement about the mounting pin independent of one another. The third section (142) includes a bubble level or spirit vial (144) and is attached perpendicularly to the second section and parallel to the mounting pin. When the spring clip is attached to an article that is to be bent, the degree wheel and pointer provide a scale for determining the angle of the bend, and the bubble level vial gauges lateral displacement.

12 Claims, 9 Drawing Sheets

U.S. PATENT DOCUMENTS

| | | | |
|---|---|---|---|
| 6,502,322 B1 * | 1/2003 | Smochek | 33/373 |
| 6,532,675 B1 * | 3/2003 | Letourneau | 33/277 |
| 6,532,676 B1 * | 3/2003 | Cunningham | 33/286 |
| 6,622,395 B1 * | 9/2003 | Hickey | 33/529 |
| 6,640,456 B1 * | 11/2003 | Owoc et al. | 33/382 |
| 6,662,457 B1 * | 12/2003 | Dameron | 33/286 |
| 6,834,435 B1 * | 12/2004 | Turner | 33/370 |
| 2006/0016083 A1 * | 1/2006 | Huang | 33/286 |
| 2006/0064887 A1 * | 3/2006 | Chang | 33/286 |

* cited by examiner

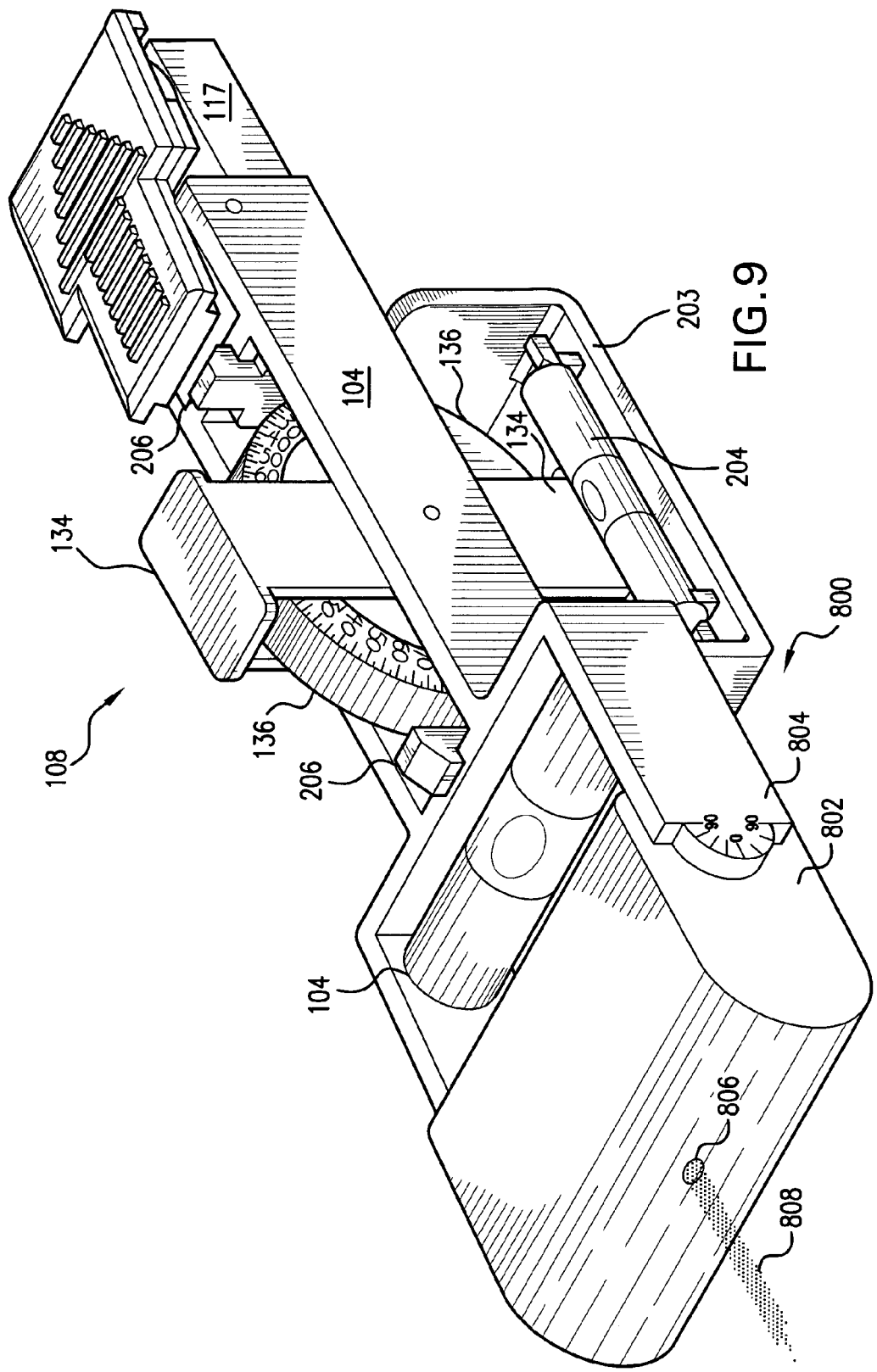

US 7,137,209 B2

LEVEL AND PROTRACTOR

CROSS REFERENCE TO RELATED APPLICATIONS

This application claims priority from U.S. Provisional Application No. 60/492,067, filed Aug. 1, 2003, entitled "Level and protractor," which is hereby incorporated by reference.

FIELD OF THE INVENTION

The present invention relates generally to a level and protractor, and in particular, to a level and protractor for use in bending and leveling of electrical conduits or any other objects, where achieving accurate angles is desirable.

BACKGROUND OF THE INVENTION

Levels are used throughout the construction industry and other industries to determine level and plumb surfaces. The most common type of level is referred to as a spirit level. The spirit level normally includes a frame which houses a closed end tube filled with alcohol, ether, or a mixture thereof. A small bubble of air is entrained in the tube and, by basic physical laws, seeks out the highest point in the tube. The tube is marked with parallel lines at equidistant points from the tube center. By observing the relationship between the parallel lines and the bubble of air, a user can visually determine whether the surface the level is resting on is substantially level. The spirit level, while useful for determining whether a surface is level, i.e., at 180 degrees, is not helpful where other angles are desired.

More sophisticated levels are known. For example, U.S. Pat. No. 5,167,075 provides a level to measure the angular displacement during pipe-bending. However, this level is cumbersome and requires the use of at least three spirit levels. In addition, this level requires some undesirable estimation of angles and undesirable rotation of parts of the level for use.

Therefore, a need in the art exists for an easy-to-use, accurate, precise and reliable level and protractor.

SUMMARY OF THE INVENTION

In accordance with one aspect of the present invention, a level and protractor tool is disclosed. The level and protractor tool has three sections. The first section includes a spring clip mounted on a frame or body. The spring clip is adapted to be attached to an item that is to be bent or otherwise measured with the level and protractor tool. The second section is contiguous with the first section. The second section includes a mounting pin defining a rotational axis for both a pointer and a degree wheel having a pendulum weight. The degree wheel and the pointer are positioned about the mounting pin for rotational movement about an axis defined by the mounting pin, independent of one another. The third section includes a bubble level or spirit vial and is attached perpendicularly to the second section and parallel to the mounting pin. When the spring clip is attached to an article that is to be bent, the degree wheel and pointer provide a scale for determining the angle of bend, and the bubble level vial gauges lateral displacement.

In accordance with another aspect of the present invention, the level and protractor tool includes a detachable base. Preferably, the detachable base connects to the level and protractor tool in the second section. The detachable base includes a bubble level vial that is parallel to the bottom surface of the detachable base. The detachable base provides a means for resting the level and protractor tool on a flat surface. And, the bubble vial provides a means to level the surface.

In another aspect of the present invention, the degree wheel and pointer are used as a standalone level and protractor. By resting the pointer on a surface with the degree wheel pivotally mounted on the pointer, the degree wheel indicates the angle of the surface. Preferably, a magnet is included on a surface of the pointer to hold the pointer on a metallic surface. Advantageously, the pointer may be gripped by a user after an angle is determined, in a manner that holds the degree wheel at the angular reading. This permits determination of an angle even when the degree wheel can not be read at the time of measurement, for example, in tight locations.

In yet another aspect of the invention, a laser pointer is attached to the level and protractor tool. The laser pointer is pivotally attached to a rotational degree wheel that permits determination of the angular displacement of the laser pointer relative to the level and protractor tool. The laser pointer provides a plumb line.

One object of the present invention is to aid in the bending of electrical conduit or any other object which should be bent at accurate angles.

Another object of the present invention is to provide an indication of a measure of an angle of a surface.

Another object of the present invention is to provide an indication of a relative measure of angles between objects.

Other objects of this invention will become apparent upon a reading of the following description taken together with the drawings.

BRIEF DESCRIPTION OF THE DRAWINGS

FIG. 9 is a perspective view of yet another embodiment of a level and protractor tool in accordance with the present invention, wherein the tool includes a laser plumb attachment.

DETAILED DESCRIPTION OF THE PREFERRED EMBODIMENTS

Figure 1:
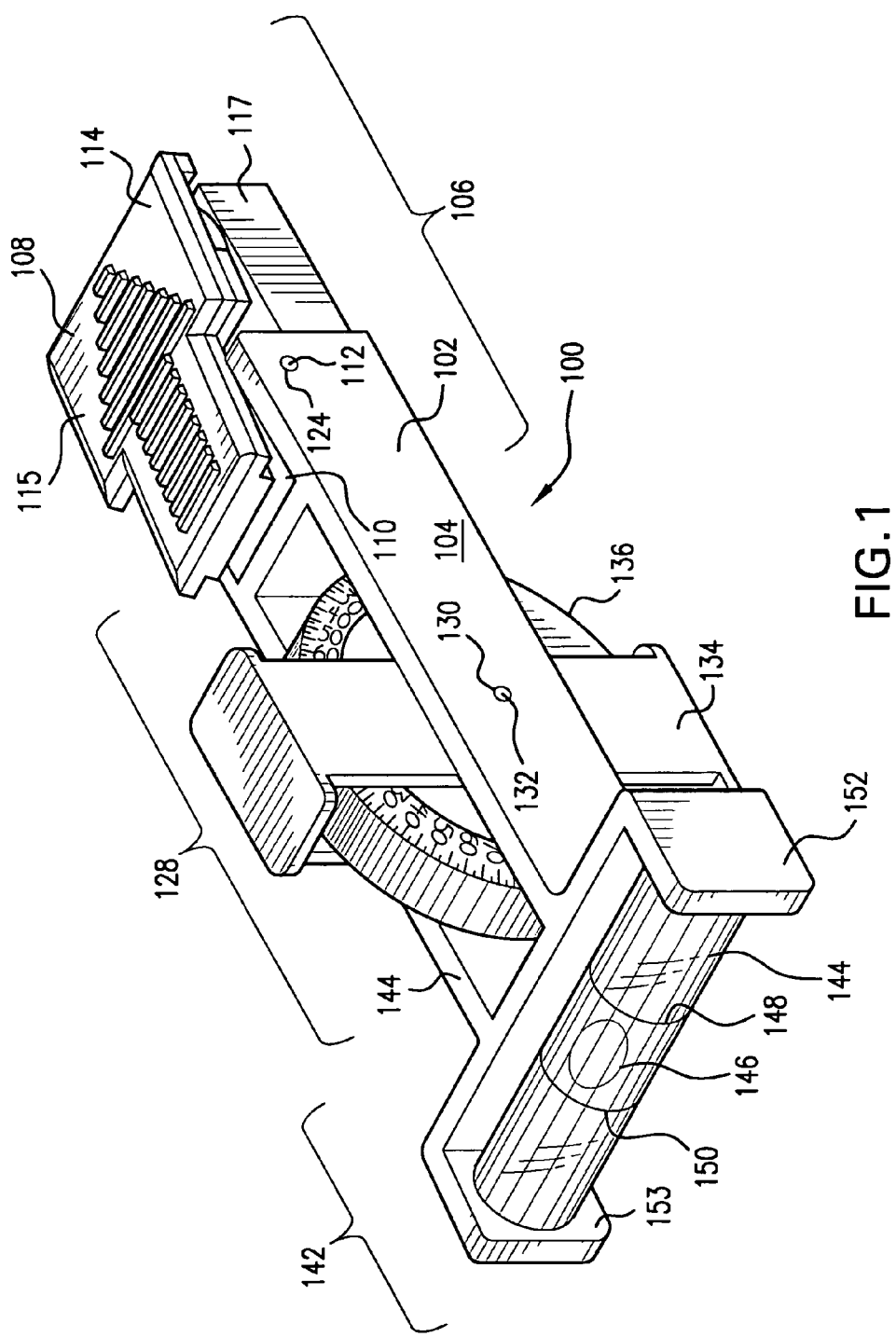
FIG. 1 is a perspective view of a level and protractor tool in accordance with the present invention.
Figure 2:
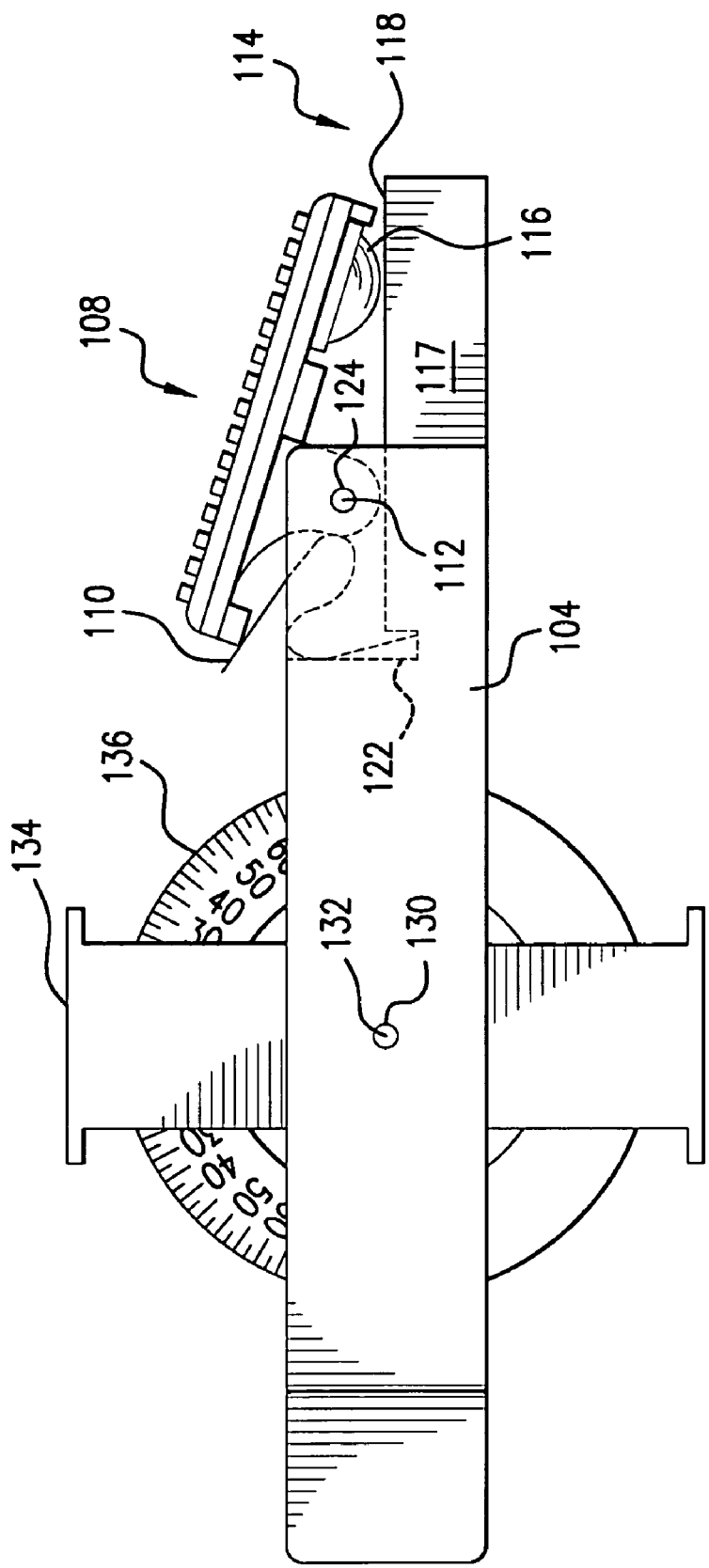
FIG. 2 is a side view of the level and protractor tool of FIG. 1.

FIG. 1 and FIG. 2 show a perspective and side view, respectively, of a preferred embodiment of a level and protractor tool 100 in accordance with the present invention. The level and protractor tool is especially suited for precise bending of various articles (not shown), including, for example, electrical conduit, pipe, steel rods and other bendable items, regardless of shape or material composition. The tool 100 has a frame or body 102. The body 102 preferably has two parallel mounting rails 104, which generally define a first section 106 and a second section 128. A third section 142 intersects the second section 128 generally perpendicular to mounting rails 104. Preferably, body 102 is made of molded clear, high-impact polycarbonate, but any other suitable rigid material may alternatively be used. Body 102 provides a common reference for centering and aligning other portions of tool 100.

The first section 106 houses a spring clip 108. The spring clip 108 is readily attached and removed from an item that is to be bent or otherwise measured. Spring clip 108 includes a spring portion 110, a pin portion 112, and a clip portion 114. The clip portion 114 has top portion 115 and a base or bottom portion 117. A bottom surface of the top portion 115 has two gripper pads 116 spaced adjacent each other. See also FIG. 6. The bottom portion 117 has a gripping surface 118. Preferably, the gripper pads 116 are semi-spheres made out of vinyl, rubber, plastic or any other suitable material. The first section 106 acts as a spring housing, which includes a spring retaining slot 122 (shown in phantom in FIG. 2) for spring 110, and a through-hole 124 for pin 112. Spring 110 is preferably thin stainless steel tooled to have the resilient shape shown in FIG. 1 and FIG. 2. The clip portion 114 is designed to secure the level and protractor tool 100 to a conduit or a pipe (not shown) going through the bending process. Due to the rectangular nature of the bottom portion 117 of clip portion 114 and the presence of the gripper pads 118 on the top portion 115 of clip portion 114, the clip portion 114 and the bottom portion 117 form at least four contact points on the item to be bent (not shown), providing for a secure non-sliding grip.

The second section 128 provides a protractor for precise measurement of angular relationships. A through-hole 130 is bored through the mounting rails 104. A mounting pin 132 is positioned in the through-hole 130. A pointer 134 and a degree wheel 136 are adapted for rotation about an axis defined by mounting pin 132. The pointer 134 and the degree wheel 136 are capable of independent rotation about the axis defined by the pin 132, wherein the rotation of one does not necessarily cause the other to also rotate. The degree wheel 136 moves freely about its axis of rotation, the movement being caused by gravity acting on a pendulum weight 306 (See FIG. 3). The pointer 134, on the other hand, is adapted to rotate in response to a force, for example, from a user, but generally maintain its position when no external force is applied. That is, the pointer 134 should not generally move in response to gravity alone. The pointer 134 is mounted between the two mounting rails 104 in a manner to allow it to rotate independently of the degree wheel 136. This allows for easy alignment of the pointer 134 with the necessary angle of the bend indicated by the degree wheel 136.

The second section 128 is perpendicularly connected to a third section 142. The third section 142 houses a spirit or bubble level vial 144. Vial 144 is a conventional bubble level vial found in most level tools and is filled with a liquid such as alcohol, ether, or a mixture thereof. Air bubble 146 is entrained in vial 144 and will be positioned between center lines 148 and 150 when the outer faces 152 of the third section 128 are positioned level with a reference surface (not shown). Preferably, vial 144 snaps over and is held in place by two raised pads (not shown), each pad being positioned on opposite ends of the inner surface 153 of the third section 142. This placement of the vial 144 allows for the zeroing of the unit that is perpendicular to the plane of the degree wheel 136. When bending conduit or the like, this help prevent the skewing of the conduit (referred to as "dog-legs" or torquing) allowing for a straight bend.

Figure 3:
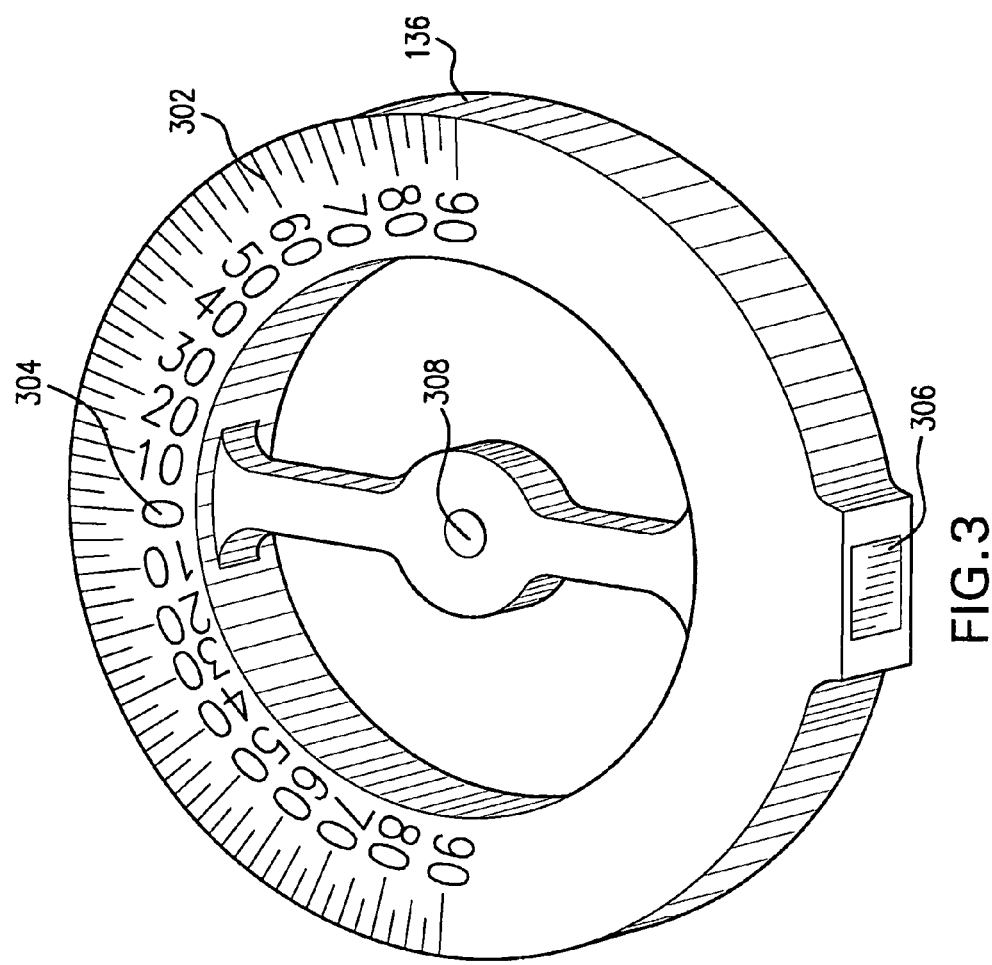
FIG. 3 is a perspective view of the degree wheel shown in FIG. 1.

FIG. 3 is a perspective view of a preferred embodiment of the degree wheel 136 in accordance with the present invention. The degree wheel 136 is inscribed with angle indicia marks 302. The marks 302 are similar to ones found on a conventional protractor and serve to accurately indicate the angle of a bend. The zero mark 304 is located opposite a pendulum weight 306, positioned in the bottom of the degree wheel 300. Gravity acts on the pendulum weight 306, causing the pendulum weight 306 to always point straight down. This orients the degree wheel 136 when it freely rotates about the mounting pin 132. Finally, the degree wheel 136 has a center hole 308, which needs to be sufficiently large to allow free movement of the wheel about the mounting pin 132. The relative largeness of the hole 308 allows for the wheel to wobble.

Preferably the degree wheel 136 is made of high impact polycarbonate or plastic, but any suitable material may be used. Preferably, the degree wheel 136 has numerical degree markings and other indicia, for example, a trademark. Most preferably, these indicia are engraved and filled with paint. This reduces the weight of the degree wheel and provides more durability over, for example, raised and painted indicia.

In operation, tool 100 is attached to the end of the item to be bent using the spring clip 108. Level and protractor tool 100 is calibrated or set to "0" by aligning the center line on the pointer to the "0" mark on the center wheel. This allows the tool to be inline with the bending apparatus. Next, the item to be bent is rotated the until the bubble in the vial 144 is centered between the lines 148, 150. Then, the item is bent until the pointer 134 lines up with the desired degree mark on the degree wheel 136.

Figure 4:
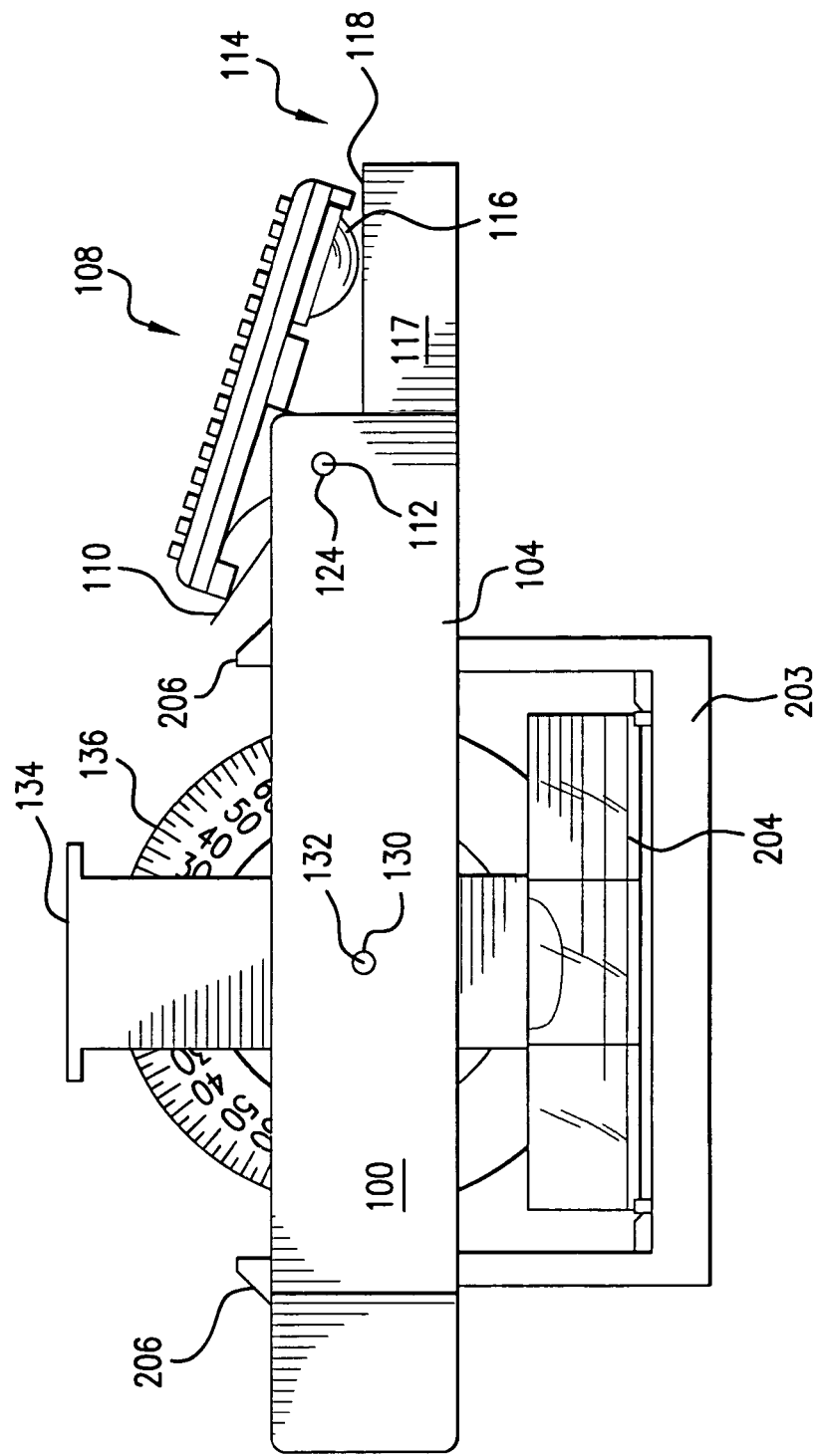
FIG. 4 is a side view of an alternate embodiment of a level and protractor tool in accordance with the present invention, the tool including a detachable base.
Figure 5:
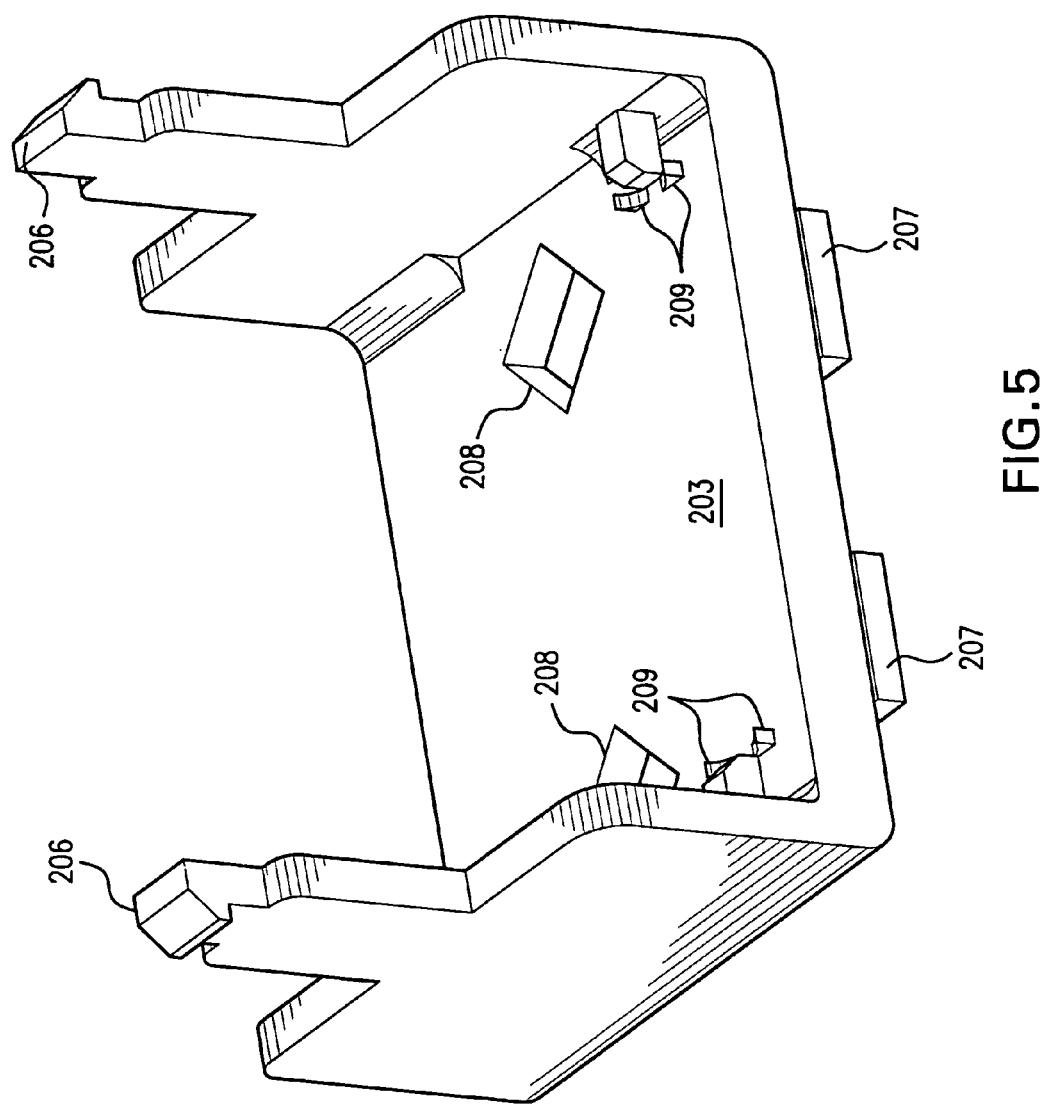
FIG. 5 is a perspective view of the detachable base shown in FIG. 4.

FIG. 4 is a side view of an alternate embodiment of the present invention. In this embodiment, the level and protractor tool 100 is equipped with a removable base 203. The base 203 has a bubble level vial 204, which is identical to the bubble level vial 144. Base 203 is shown apart from the level and protractor tool 100 and without vial 204 in FIG. 5. The bottom of the base 203 preferably includes at least one magnet 207, most preferably two, for use in attaching to metallic surfaces, for example, electrical or water pipes, or flat metallic surfaces, such as circuit breaker boxes, appliances and the like. Magnetic or gravitational attachment using base 203 serves a similar purpose to the clip shown in FIG. 1, in that the magnets hold the level and protractor tool 100 in place, while the object is leveled, bent or otherwise measured. Base 203 provides the ability for the tool 100 to be used in a fashion similar to a conventional level. The body 102 attaches to the base 203 by pushing the locking fingers 206 in to the body 102 until they snap onto the body 102. Two through-holes 208 are provided in the bottom of the base and may be used for attachment to hooks and nails (not shown) on, for example, non-metallic surfaces, such as glass doors, windows and the like. The through-holes 208 are also used as mounting holes for suction cups (not shown) which are preferably frictionally engaged in the holes 208. The suction cups allow for attachment on non-magnetic surfaces. Vial 204 is preferably frictionally engaged within shaped and slightly pliable protrusions 209. Preferably, base 203 is made from molded, high-impact polycarbonate, but any other suitable substance made be used.

Figure 6:
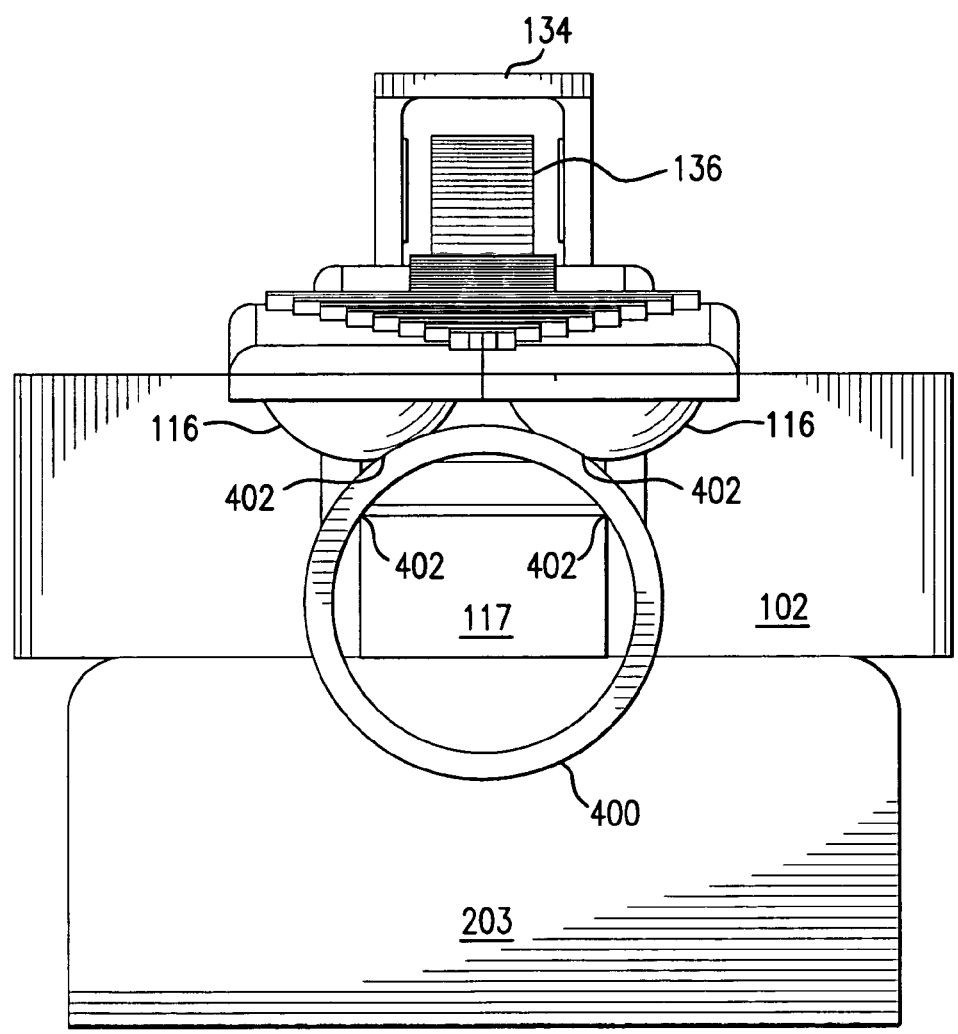
FIG. 6 is an end view of the level and protractor tool shown in FIG. 4, wherein the tool is attached to a cylindrical object.

FIG. 6 is an end view of the tool 100 and base 203 shown in FIG. 4. In FIG. 6, the tool 100 is shown attached to a ring or cylindrical object 400 to illustrate attachment of the spring clip 108 to an item. The four points of contact 402 between the spring clip and the ring are clearly illustrated. Notably, pads 116 provide two gripping locations to the circumference of the conduit, increasing the gripping strength and providing greater stability for the complete unit. Also, as best seen in FIG. 6, the spherical shape of the gripper pads 116 maximizes an amount of contact with a curved object, such as object 400.

Figure 7:
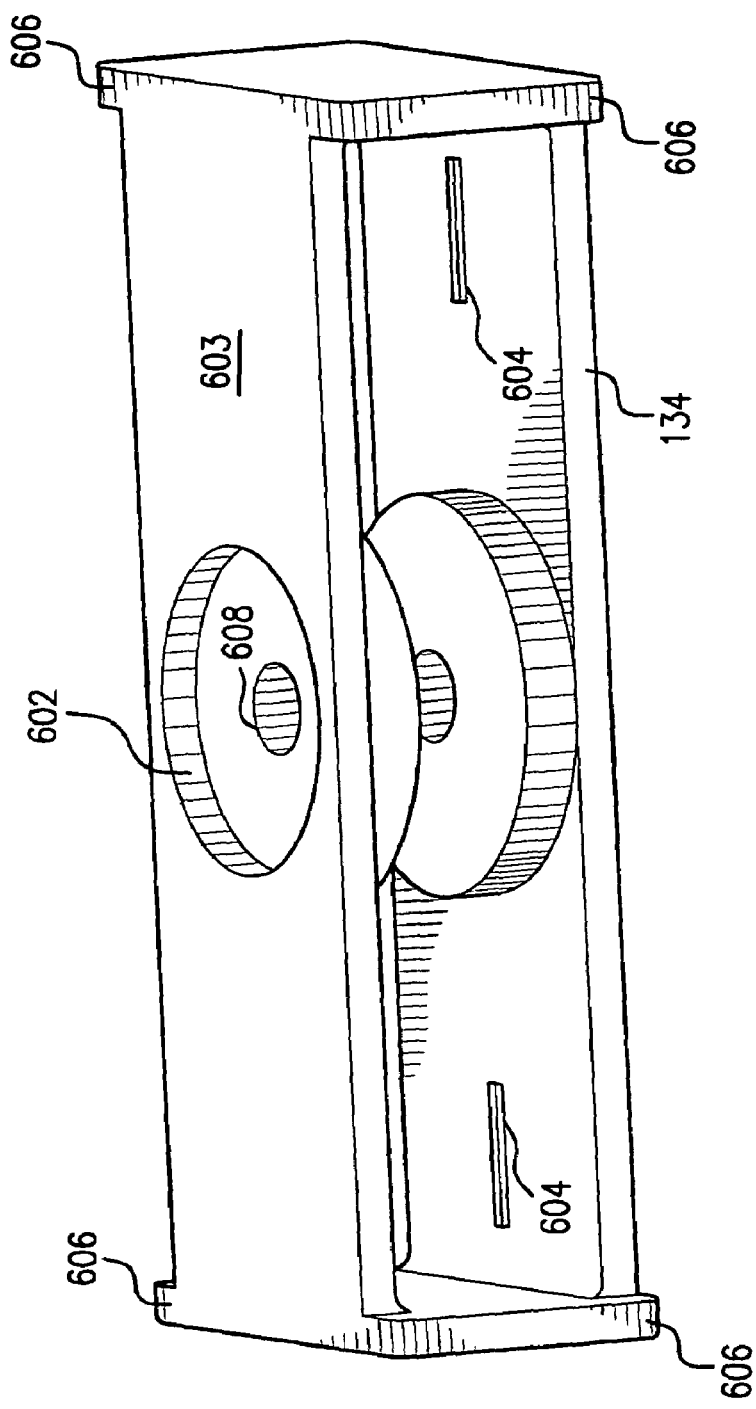
FIG. 7 is a perspective view of a pointer for use in a tool in accordance with the present invention.

FIG. 7 is a perspective view of the pointer 134, shown removed and apart from the tool 100. The pointer 134 snaps into and rotates within the body 102 and floats around the degree wheel 136 providing the ability to zero the unit in free space. Recessed areas 602, found on each side wall 603 of the pointer 136 snap over correspondingly configured raised areas on the body 102 (not shown) to allow for independent rotation from the degree wheel 136. That is, the pointer 134 rotates about the circular raised or protruding portion of the body. A raised line 604 located on the pointer 600 is used to indicate the angle measured on the degree wheel 136. Preferably, the width of the pointer is the same as the width of the mounting rails 104. In that case, the ends 606 of the pointer 600 are extended to allow pushing the pointer 600 up when it is lying parallel inside the body 102 of the level and protractor tool 100. The pointer 600 has a central hole 608. The diameter of the hole 608 is larger then the mounting pin 132. This prevents the pointer 600 from moving the degree wheel 136 during zeroing. And, this prevents the pointer 134 from being affected by rotation of the mounting pin 132 or degree wheel 136.

Figure 8:
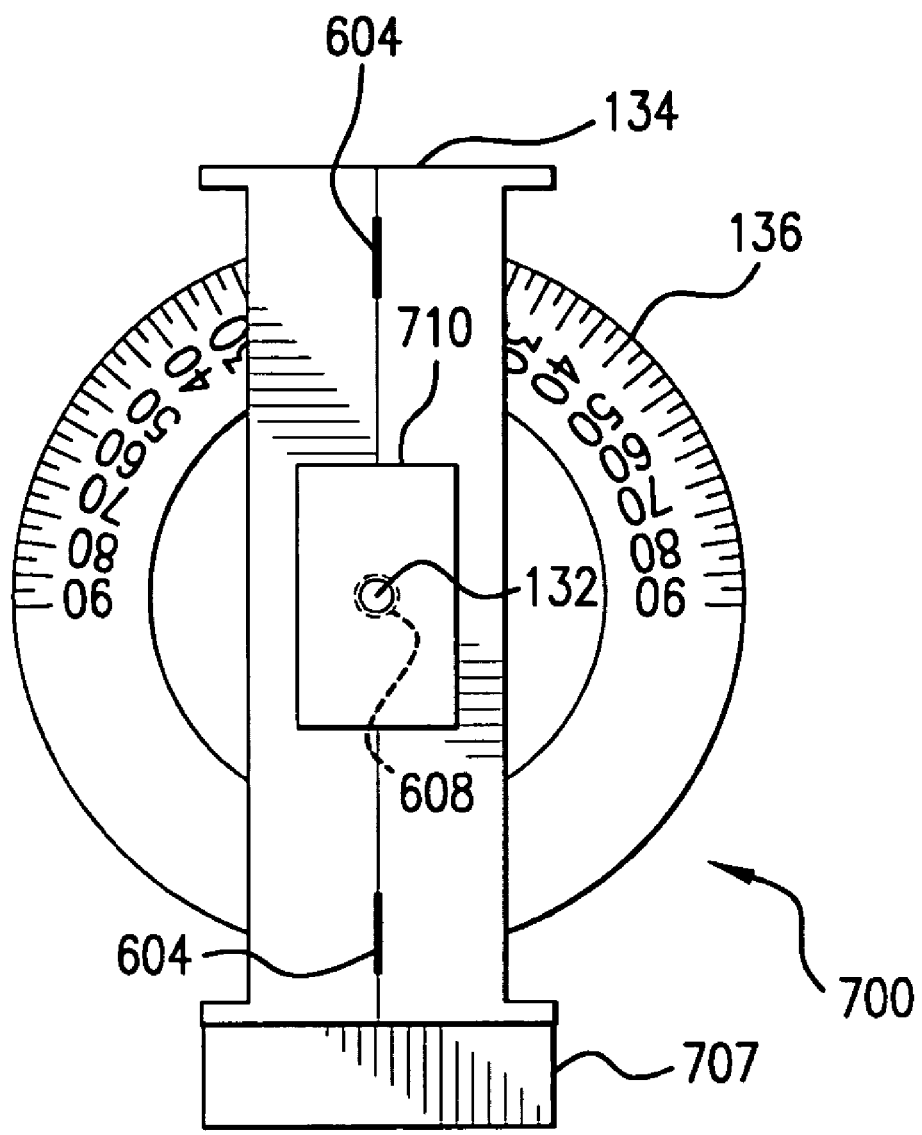
FIG. 8 is a side view of another embodiment of a level and protractor in accordance with the present invention.

FIG. 8 is a side view of another embodiment of a level and protractor tool in accordance with the present invention. Level and protractor tool 700 is compact and provides other advantages. Tool 700 includes a degree wheel 136 in combination with a pointer 134. A mounting pin 132 provides the axis of rotation for the degree wheel. As with the previous embodiments, the degree wheel 136 rotates freely without regard to pointer 134. A magnet 707 is preferably attached to the end-portion of the pointer 134. Magnet 707 facilitates attachment of tool 700 to a metallic surface. A label 710 or another item is preferably used to cover the recessed areas 602 (See FIG. 7) and retain the mounting pin 132 in place.

In operation, tool 700 may be placed with one end of the pointer 134 resting on a surface to be measured. Preferably, the end of the pointer having magnet 707 is placed on the surface. Advantageously, where a metallic surface is being measured, magnet 707 provides a means of attachment, without regard to the effects of gravity on the tool 700. After the tool 700 becomes stable, i.e., after the degree wheel 136 stops rotating, the angular displacement of the surface may be determined by comparing the angle indicia on the degree wheel with the raised line 604 on the pointer 134. This comparison may be made visually while the tool is in place on the surface being measured. Or, advantageously, by pressing on the labels 710 on both sides of the pointer 134 gently, but firmly, while the tool 700 is in place on the surface to be measured, the degree wheel is fixed in place with respect to the pointer 134 and the raised line 604. Then the tool 700 may be removed from the surface to be measured and read by user. This is particularly useful for measuring surfaces where the tool 700 can not be visually observed while on the surface.

FIG. 9 is a perspective view of another embodiment of the present invention. In FIG. 9, the third section 142 (see FIG. 1) of the level and protractor 100 is modified and equipped with a removable laser level 800. The laser level 800 is made up of a pivotally rotational laser pointer 802 mounted onto a rotational degree wheel 804. Laser pointer 802 is pivotally attached to rotational degree wheel 804 in any known manner, and preferably in a manner analogous to the pivotal attachment of pointer 134 to mounting rails 104, as described above. The laser degree wheel 804 is separate and distinct from the degree wheel 136 shown in FIG. 1. The laser degree wheel 804 is inscribed with angle indicia marks, much like a protractor, and acts to guide the laser pointer 802 to point at a specific angle. The laser pointer 802 pivots 180 degrees. The laser pointer 802 includes an opening 806 through which a laser light 808 is projected. Because of its articulating head, the laser pointer 802 acts as a plumb tool or level with the ability to project an alignment line or dot at any angle, no matter what the surface or slope. For example, to mark a point 30 degrees from any angle indicated on the degree wheel 136, just match that angle on the laser degree wheel 804 by moving the laser pointer 802 to 30 degrees.

The invention being thus described, it will be evident that the same may be varied in many ways. For example, the size of the spring clip may be varied, or an adjustable spring clip may be provided for attachment to articles of varying thickness. Also rings or other items may be used in place of spring clip 108 to attach the level and protractor tool to articles, such as, for example, solid articles. Also, a plumb line may be connected to the pendulum weight of the degree wheel. And a light source, such as an LED, may be added to the level and protractor tool for illumination in areas with poor lighting. Alternatively, glow-in-the-dark or phosphorescent materials may be used for illumination. Such variations are not to be regarded as a departure from the spirit and scope of the invention and all such modifications are intended to be included within the scope of the claims.

The invention claimed is:

1. A level and protractor tool, the tool comprising:
    a body;
    an adjustable spring clip attached to the body, the clip comprising a spring, a clip and a pin, the clip having a top surface and a bottom surface, wherein a plurality of gripper pads are attached to the top surface of the clip, and wherein the bottom surface of the clip has a gripping surface;
    a mounting pin positioned on the body, the mounting pin defining a rotational axis for a pointer and a degree wheel, the degree wheel having a pendulum weight, wherein the degree wheel and the pointer are independently, rotationally movable about an axis defined by the mounting pin; and
    a removable base attached to the underside of the body, wherein the removable base further comprises a bubble level vial, at least one magnet, and a plurality of through-holes, the through-holes positioned to receive attachments selected from at least one of hooks, nails, pins, and detachable suction cups; and
    a bubble level vial attached to the body, the bubble level vial being attached substantially perpendicular to the body and parallel to the mounting pin.

2. The level and protractor tool of claim 1, wherein the plurality of gripper pads attached to the top surface are comprised of vinyl or rubber and are substantially spherical.

3. The level and protractor tool of claim 2, wherein the clip secures an item to be bent.

4. The level and protractor tool of claim 3, wherein the clip forms at least four contact points on the item to be bent.

5. The level and protractor tool of claim 1, wherein the degree wheel further comprises a center through-hole of sufficient size to allow for the degree wheel to rotate freely with wobble about the mounting pin.

6. The level and protractor tool of claim 5, wherein the degree wheel has a plurality of angle indicia marks, the plurality of angle indicia marks including a zero mark, the zero mark being positioned directly opposite the pendulum weight.

7. The level and protractor tool of claim 1, further comprising a removable laser level.

8. The level and protractor tool of claim 7, wherein the removable laser level comprises a pivotally rotational laser pointer, the laser pointer coaxially connected to a rotational degree wheel, the degree wheel having a plurality of angle indicia marks capable of indicating the angular direction of the laser pointer.

9. The level and protractor tool of claim 1, further comprising a removable light source.

10. The level and protractor tool of claim 1, further comprising a plurality of attachment rings for attaching the tool to solid items.

11. A level and protractor tool, the level and protractor tool comprising:
- a body, the body comprising a plurality of parallel mounting rails, a first section defined by the parallel mounting rails, the first section comprising a spring clip contained within a housing, the housing comprising a retaining slot for a spring, a through-hole portion for a pin, and a base;
- a second section attached to the first section and defined by the parallel mounting rails, the second section comprising a mounting pin positioned between the parallel mounting rails, the mounting pin defining a rotational axis for a pointer and a degree wheel having a pendulum weight, the degree wheel and the pointer being capable of independent rotational movement about the mounting pin, the degree wheel and the pointer positioned between the plurality of parallel mounting rails;
- a third section, the third section comprising a removable base connected perpendicular to the mounting rails of the second section of the body, the base comprising a bubble level vial, at least one magnet, and a plurality of through-holes, the through-holes positioned to receive detachable suction cups; and
- a fourth section perpendicularly attached to the second section, the fourth section comprising a bubble level vial and a removable laser level.

12. The level and protractor tool of claim 11 wherein the degree wheel has indicia for indicating an angular displacement.

* * * * *